United States Patent [19]

Cruickshank et al.

[11] 4,224,500
[45] Sep. 23, 1980

[54] METHOD FOR ADJUSTING ELECTRICAL DEVICES

[75] Inventors: David G. Cruickshank, Hopewell Township, Mercer County; Jose M. Muniz, Woodbridge Township, Middlesex County, both of N.J.

[73] Assignee: Western Electric Company, Inc., New York, N.Y.

[21] Appl. No.: 962,585

[22] Filed: Nov. 20, 1978

[51] Int. Cl.³ .............................................. B23K 9/00
[52] U.S. Cl. ............................... 219/121 LE; 29/593; 29/602 R; 336/178
[58] Field of Search .... 219/121 LM, 121 L, 121 EM, 219/121 EB, 121 P, 121 R; 336/83, 178; 29/593, 602

[56] References Cited

U.S. PATENT DOCUMENTS

| | | | |
|---|---|---|---|
| Re. 27,766 | 10/1973 | Hanfmann | 219/121 LM |
| 3,400,456 | 9/1968 | Hanfmann | 29/620 |
| 3,548,492 | 12/1970 | Weber | 29/602 |
| 4,150,278 | 4/1979 | Resener | 219/121 LM |

*Primary Examiner*—C. L. Albritton
*Attorney, Agent, or Firm*—D. J. Kirk

[57] ABSTRACT

A laser beam (23) is directed at a portion of at least one of a pair of opposed sections (12 or 13) which define an air gap (22) in an inductive device (10). That portion is heated to cause the material of the section to flow into the air gap to adjust the device by decreasing the reluctance of the device to increase the inductance thereof.

5 Claims, 2 Drawing Figures

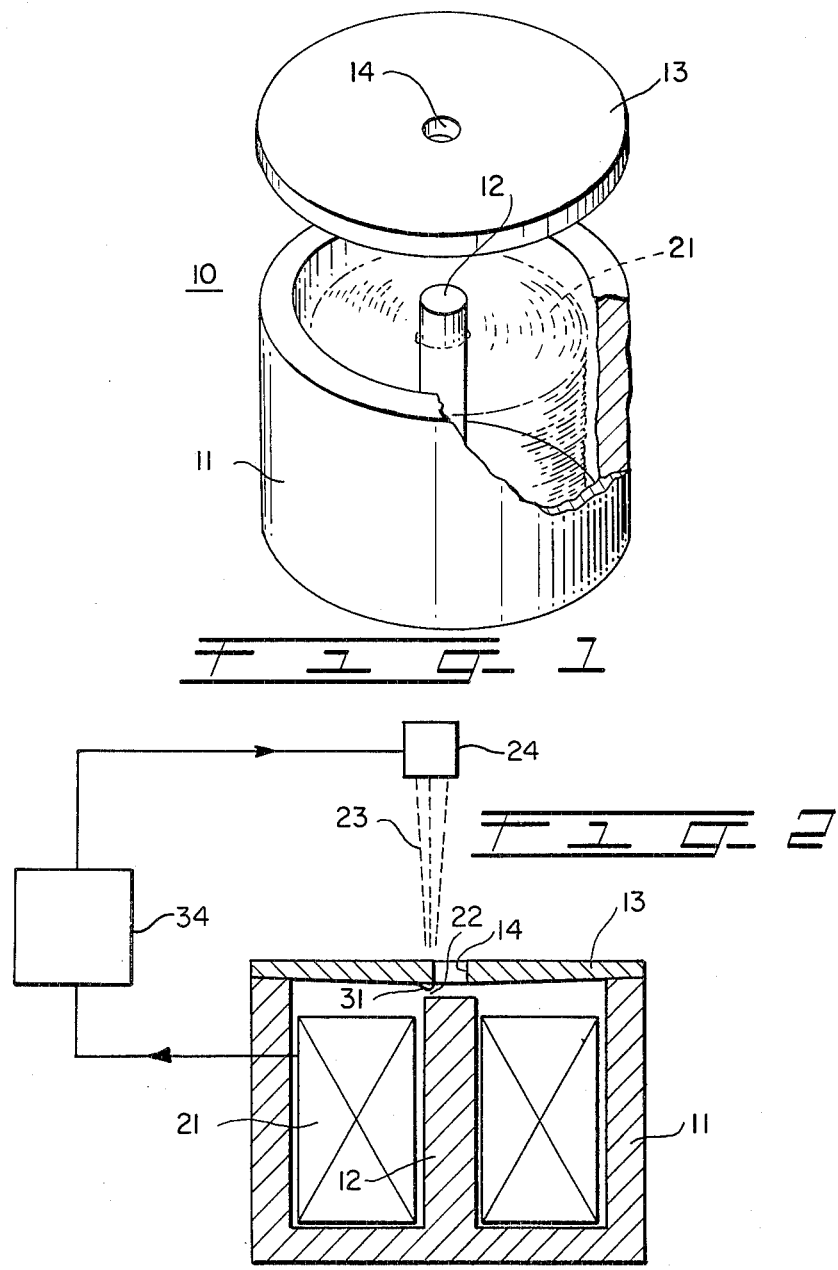

METHOD FOR ADJUSTING ELECTRICAL DEVICES

TECHNICAL FIELD

This invention relates to electrical devices and to methods of adjusting said devices. In particular, the invention is directed to such devices having an air gap therein which, when altered, will affect an electrical characteristic of the device.

BACKGROUND OF THE INVENTION

The instant invention will be described as it relates to adjusting an electrical characteristic of a cup core transformer by changing the dimensions of an air gap in the magnetic circuit of the transformer. However, the invention should not be so limited for other devices having air gap portions which, when altered will affect an electrical characteristic of the device (e.g., capacitors) would fall within the purview of the instant invention.

Ferrite core transformers are fabricated by forming a mixture of oxides of iron and zinc, together with manganese carbonate, which mixture is thereafter compacted or pressed, and then fixed to form a desired rigid geometric core configuration. The ferrite cores must initially be pressed into the desired shape with oversized dimensions, typically ranging from ten to twenty percent, so as to compensate for the subsequent shrinkage thereof during firing. Accordingly, it becomes readily apparent that whenever very close tolerances are required with respect to critical core dimensions, such as an air gap formed in sectioned cores, abrasive machine grinding or lapping operations have often been required heretofore.

Such auxiliary operations are both time consuming and expensive, and have been particularly required in connection with the manufacture of cup-shaped ferrite cores. The cup core transformer typically has a circular end wall connected to a thin cylindrical outer wall and an axially disposed tubular leg portion which defines an inner wall. The annular volume between the inner and outer walls accommodates at least one toroidal shaped coil. A planar circular cap is affixed to the open end of the transformer to enclose the device resulting in an air gap between the cap and the free end of the axially disposed tubular member. The cap has a central aperture therein which is aligned with the axial leg portion. Normally a magnetic slug is threadably inserted in the aperture for movement into the air gap towards the free end of the axial leg to alter the gap therebetween to adjust the reluctance of the magnetic circuit of the transformer and alter the inductance thereof.

Usually, the machining of the free end of the tubular leg is accomplished so as to insure that the air gap between the cap and the free end is greater than a predetermined value. The magnetic slug can then be threadably inserted through the aperture in the cap and extend into the air gap to decrease the effective distance therebetween. However, the use of such a magnetic slug is not only expensive, but the slug can become loose and undesirably alter the inductance of the magnetic circuit of the transformer when in use.

One technique which eliminates the use of the magnetic slug is described in copending U.S. patent application Ser. No. 761,084, filed Jan. 21, 1977, which is assigned to the instant assignee. In that application, the air gap between the cap and the free end of the axially disposed leg is sufficiently narrow so as to yield a reluctance less than desired. Adjustment to a higher reluctance value is accomplished by directing a laser beam through the aperture in the cap onto the leg to remove material therefrom to alter the gap and increase the reluctance of the magnetic circuit.

An alternative method is described in copending U.S. patent application Ser. No. 759,609, filed Jan. 14, 1977, which is also assigned to the instant assignee. In that application, material is removed from the outer or end walls of an inductive device, in a direction perpendicular to the flux path, to decrease the cross-sectional area and increase the reluctance of the transformer.

The above-referred to methods have been found to be most effective to increase the reluctance of the magnetic circuit of the transformer in order to decrease the inductance thereof. Both methods require that the air gap initially be smaller than desired to provide a reluctance less than desired. However, machining of the transformer is most difficult, in particular, where close tolerances are required. Thus, if careful control of the machining process is not exercised, the resultant air gap may be greater than required. Also, on occasion, it may be necessary to readjust a priorly adjusted device in which the air gap must be decreased. Such a decrease of the air gap cannot be accomplished using the above techniques.

SUMMARY OF THE INVENTION

The instant method has overcome the foregoing problem of altering an electrical characteristic of a device wherein that characteristic is dependent upon an air gap between sections within the device. The method comprises the step of heating a selected portion of at least one of the sections to cause a portion of the surface material to flow into the air gap to decrease the minimum distance between the opposed sections and alter the electrical characteristic of the device.

Advantageously, the instant method can be used to alter the electrical characteristic of the device in situ.

Additionally, no debris is generated as the material is heated to cause a molten flow which produces substantially no vaporization or material removal.

BRIEF DESCRIPTION OF THE DRAWING

FIG. 1 is a partial perspective view of a cup core transformer; and

FIG. 2 is a cross-sectional view of the ferrite cup core transformer of FIG. 1 indicating the instant inventive adjusting technique.

DETAILED DESCRIPTION

FIG. 1 depicts a ferrite cup core transformer, generally designated by the numeral 10. The transformer 10 has a housing 11 with an axially disposed leg 12 therein. A cap 13 having a central aperture 14 is placed on the top of the housing 11 and may be fixedly attached thereto by an adhesive bond or held in place by clamps (not shown). One or more (one shown in phantom) toroidal wire wound coils 21 may be mounted about the leg 12 in the housing 11.

Once the cap 13 is affixed to the housing 11 as shown in the cross-sectional view of FIG. 2, the inductance of the device is determined by the reluctance of the magnetic flux path which includes the housing 11 as well as the leg 12, the cap 13 and an air gap 22 which exists between the free end of leg 12 and the cap 13. When power is applied to the windings of the coil 21 via leads (not shown) extending through the housing 11, reluctance of the magnetic flux path may be altered by threading a magnetic slug (not shown) through the aperture 14 into the air gap. However, as hereinbefore indicated, such slugs are expensive and suffer from poor mechanical stability.

The present invention which precludes the necessity of using such a magnetic slug is depicted in the cross-sectional view of FIG. 2. A beam of radiant energy 23 which preferably is from a laser 24 is directed at the cap 13 in the area proximate the periphery of the aperture 14. The material when heated to a temperature above the melting temperature causes a slight deformation or blob 31 of material to flow into the air gap 22. The amount of flow and movement into the air gap 22 may be controlled by monitoring the change of inductance of the device with an inductance monitoring apparatus 34 during heating. Once the desired increase in inductance has been attained, the radiant energy 23 is terminated via a feedback loop comprised of the monitoring apparatus 34 and the laser 24, to solidify the blob 31.

In a particular working embodiment, a MnZn or NiZn ferrite cup core transformer 10 having a cap thickness of 0.070 inch and an aperture of 0.200 inch in diameter and an initial air gap of 0.005 inch was adjusted by directing a Nd:Yag laser beam having a wavelength of 1.06μm at the cap 13 in the vicinity of the aperture 14. The laser focussed discrete pulses of energy (100μ sec in duration of 50 millijoules o energy), the beam having a cross-sectional area of $80 \times 10^{-6}$ sq. inches at the impact point. The temperature at the impact point was approximately 1000° C. which was sufficient to cause the ferrite material to flow while causing a minimum of vaporization.

It should be realized that the blob 31 can be formed around the full periphery of the aperture 14 or any portion thereof depending on the amount of increase in inductance required. Additionally, although a laser was used for an energy source, the invention is not so limited, for any energy source that can focus sufficient energy on the selected portion of the transformer 10 to cause the material to flow will suffice.

Although the exemplary embodiment advantageously made use of a cap 13 having an aperture 14 therein, the instant invention is not limited to such a structure. An unapertured cap 13 may be selectively heated, from outside the transformer 10, to cause a portion of the cap material to reflow to decrease the minimum distance of the air gap 22.

What is claimed is:

1. A method for altering an electrical characteristic of a device wherein that characteristic is dependent upon an air gap between sections of the device, the method comprising:

heating a selected portion of at least one of the sections to cause a portion of the section to flow into the air gap to decrease the minimum distance between the sections, while maintaining a separation therebetween, to alter the electrical characteristic of the device.

2. The method for altering an electrical characteristic of a device as set forth in claim 1, which is further characterized by the steps of:

monitoring the electrical characteristic of the device; and removing the heat from the selected portion when the characteristic has achieved a predetermined value.

3. The method as set forth in claim 1, wherein:

heating is accomplished by directing at least one laser beam pulse on the selected portion to be heated.

4. The method as set forth in claim 1, wherein:

the device is an inductor; and the characteristic is inductance.

5. A method for adjusting the inductance of a ferrite cup core transformer, the transformer having a cylindrical outer wall, an end wall and a cylindrical leg axially disposed therein with at least one wire wound coil mounted about the leg, a cap having a central aperture therein affixed to the top of the outer wall and an air gap defined by the cap and a free end of the leg, the method comprising the steps of:

directing a laser beam at a portion of the cap proximate the periphery of the aperture to heat said portion to cause the material to flow towards the free end of the leg to increase the inductance of the transformer;

monitoring the inductance; and removing the laser beam from said portion to stop the material flow when the inductance attains a desired value.

* * * * *